(12) United States Patent
Hurst (10) Patent No.: US 9,083,943 B2
(45) Date of Patent: Jul. 14, 2015

(54) METHOD FOR GENERATING TEST PATTERNS FOR DETECTING AND QUANTIFYING LOSSES IN VIDEO EQUIPMENT

(75) Inventor: Robert Norman Hurst, Hopewell, NJ (US)

(73) Assignee: SRI International, Menlo Park, CA (US)

( * ) Notice: Subject to any disclaimer, the term of this patent is extended or adjusted under 35 U.S.C. 154(b) by 1545 days.

(21) Appl. No.: 12/132,059

(22) Filed: Jun. 3, 2008

(65) Prior Publication Data

US 2008/0297603 A1 Dec. 4, 2008

Related U.S. Application Data (60) Provisional application No. 60/941,773, filed on Jun. 4, 2007, provisional application No. 60/941,776, filed on Jun. 4, 2007, provisional application No. 60/941,771, filed on Jun. 4, 2007, provisional application No. 60/978,567, filed on Oct. 9, 2007.

(51) Int. Cl.
  *H04N 17/00* (2006.01)
(52) U.S. Cl.
  CPC ................. *H04N 17/00* (2013.01)
(58) Field of Classification Search
  CPC .................................................. H04N 17/00
  USPC ................. 348/180–194, 500, 515
  See application file for complete search history.

(56) References Cited

U.S. PATENT DOCUMENTS

| 5,642,171 | A * | 6/1997 | Baumgartner et al. | 348/515 |
| 7,020,894 | B1 * | 3/2006 | Godwin et al. | 348/515 |
| 2006/0139490 | A1 * | 6/2006 | Fekkes et al. | 348/515 |
| 2007/0126929 | A1 * | 6/2007 | Han et al. | 348/194 |
| 2007/0223874 | A1 * | 9/2007 | Hentschel | 348/E5.009 |
| 2007/0245222 | A1 * | 10/2007 | Wang et al. | 714/798 |
| 2008/0079851 | A1 * | 4/2008 | Stanger et al. | 348/575 |
| 2010/0158476 | A1 * | 6/2010 | Hao et al. | 386/83 |

OTHER PUBLICATIONS

Han, Chan-Ho, and Kyu-Ik Sohng. "DTV Lip-Sync Test Using Time-Indexed Audio and Video Signals Without Effect on Program." IEEE Transactions on Broadcasting. Mar. 2005: 62-68. Web. Mar. 28, 2012. <http://palgong.knu.ac.kr/~aval/publication/i_j/DTV Lip-Sync Test Using Time-Indexde Audio and Video Signals Without Effect on Program.pdf>.*

"EBU Digital AV Sync and Operational Test Pattern, Rev. 1.3." Feb. 2003. LYNXTechnik AG. Web. Mar. 28, 2012. <http://www.lynx-technik.com/fileadmin/user_upload/DownloadFiles/Series_3000_MiniModules/Manuals/EBU_A-V_Sync_Pattern.pdf>.*

"Dual Link HD-SD Test Signal Generator Module—PT8613." Mar. 2008. DK-Technologies. Web. Mar. 28, 2012. <http://www.dk-technologies.com/downloads/specs/PT8613.pdf>.*

* cited by examiner

*Primary Examiner* — Randy Flynn
(74) *Attorney, Agent, or Firm* — Moser Taboada (57) ABSTRACT

A method for detecting and quantifying losses in at least one of video and audio equipment, comprising the steps of generating the test pattern; processing the test pattern through video equipment; and displaying the processed test pattern to a display to a viewer. In one embodiment, the test pattern is indicative of video compression losses due to quantization. In another embodiment, the test pattern is indicative of a color transformation mismatch after encoding/decoding with incompatible video transmission standards. In a third embodiment, the test pattern is iso-luminant after a color transformation between a first and second video transmission standard. In a fourth embodiment, the test pattern is indicative of lipsync error.

20 Claims, 8 Drawing Sheets

METHOD FOR GENERATING TEST PATTERNS FOR DETECTING AND QUANTIFYING LOSSES IN VIDEO EQUIPMENT

CROSS-REFERENCE TO RELATED APPLICATIONS

This application claims the benefit of U.S. provisional patent application No. 60/941,773 filed Jun. 4, 2007, 60/941,776 filed Jun. 4, 2007, 60/941,771 filed Jun. 4, 2007, and 60/978,567 filed Oct. 9, 2007, the disclosures of which are incorporated herein by reference in their entirety.

FIELD OF THE INVENTION

The present invention relates generally to video transmission, and more particularly to a method for generating test patterns for visually and numerically indicating losses in at least one of video and audio equipment.

BACKGROUND OF THE INVENTION

Video (and audio) has moved into the digital age, wherein still pictures and video are now imaged by CCD solid state devices instead of "analog" chemical films, and processed by microprocessors. One side effect of the digitization process is that very large amounts of data are produced, which may be larger than the memory capacity of the digital imaging devices. Lossless and lossy compression algorithms have been developed to reduce these large amounts of data to a manageable size. Unfortunately, completely lossless compression reduces the size of files by only about 50% or less. Much higher compression ratios are needed, which require lossy compression methods. It is the goal of such methods that the resulting losses would not be noticeable to the human visual system. While several standards have been developed with these goals in mind, some unintended artifacts may be produced in the resulting images, which may be visually noticeable. Many of today's video encoders attempt to reduce or remove distorting elements that would likely be missed by a human viewer, but this is a matter of subjective judgment.

It is desirable to quantify the degree of distortions. Compression distortion is often quantified using a "before and after" technique wherein a computer compares frames before and after encoding. This requires access to the original frames. Others have created "single-ended, reference free" techniques, but these techniques cannot discern small distortions, which renders them unsuitable for professional work. These techniques are also sensitive to the underlying video content. Test signals such as "color bars" and "multiburst" have been in use for many years, but were designed to test degradations of analog signals, and are thus unsuitable for testing digital compression systems.

Another class of distortions involves "transformations" and "reverse transformations" of colors in images using incompatible transmission standards. For example, each colored pixel in a video image is represented as a set of three values corresponding to red, green, and blue (RGB). It is common practice to perform a reversible matrix transformation on a first set of red, green, and blue values to obtain a different set of values, e.g., Y'CbCr prior to transmitting or encoding the Y'CbCr values, then transforming the Y'CbCr values back to RGB values. One advantage of performing this type of transformation is that the resolution of the two color difference arrays, Cb and Cr, can be reduced as a form of compression. There exists more than one reversible transform for this purpose. For many years the "Rec.601" standard (an abbreviation for ITU-R Recommendation BT 601) was used for standard definition video, but with the introduction of high definition television, a new transform was defined for high definition video, known in the art as "Rec.709" (an abbreviation for ITU-R Recommendation BT 709). Unfortunately, these two standards are incompatible, i.e., encoding with one standard while decoding with the other standard introduces color errors. It would be desirable detect when such a transform mismatch has occurred.

Figure 1:
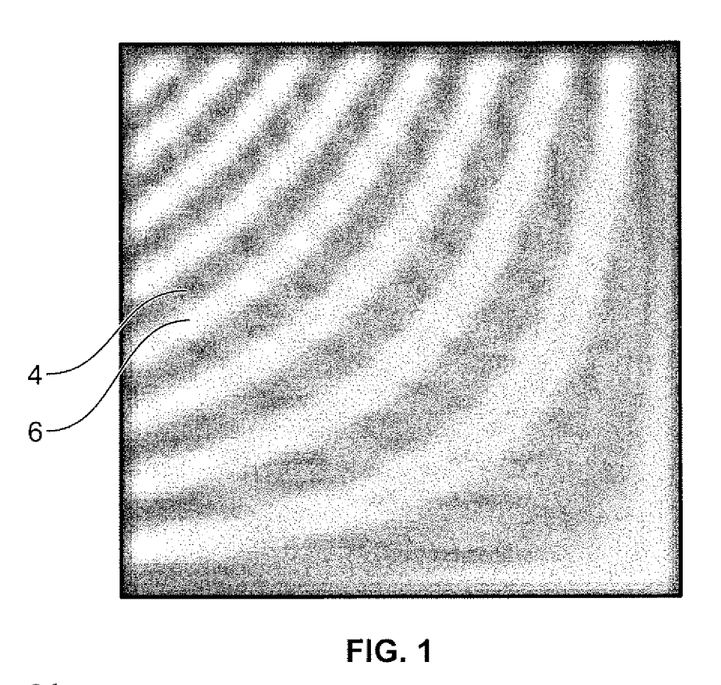
FIG. 1 is a diagram depicting an "iso-luminant" pattern in the prior art.

Another issue related to reversing RGB to Y'CbCr is the creation of test patterns in the Y'CbCr domain for analyzing the performance of equipment that processes video in that domain. Further, it is desirable to test the Cb and Cr channels independently from the Y' channel. For example, a test pattern may be synthesized so that the Y' "luma" component has a constant value, while the Cb and Cr components are varied in some way that will challenge the equipment under test. Such a pattern may be termed an "iso-luma" pattern. An example is shown in FIG. 1, which is from a Snell and Wilcox test pattern. FIG. 1 shows the alternating green 4 and purple 6 bands typical of a signal applied equally to both Cb and Cr channels.

Unfortunately, if an "iso-luma" pattern was transcoded from, say, the "Rec.601" domain to the "Rec.709" domain (or vice versa), the luma component would not likely remain constant, and the iso-luma property of the pattern would be lost in the transcoding operation. It would be desirable for a test pattern to remain iso-luminant despite having been transcoded from one domain to another domain.

Since the introduction of "talkies" (movies with sound), synchronizing the image sequence and the sound has been an issue. The film sound pickup head was located beyond the lower loop, and a loop that was too small would result in the sound being played too early. The error is most easily detected in scenes where people are talking, because their lips would be out of synchronization with the sound. Thus, a timing offset between video and audio streams, called "lipsync error" would result.

Analog television systems did not suffer much from lipsync errors until the advent of video processing techniques that used one or more frames of delay, such as a frame synchronizer or a digital video effects unit (DVE). As the cost of electronic storage has dropped, more and more frames of delay are included in the processing path of the video. Since audio is usually handled in a separate signal path during production, the equipment that introduced the video delay usually has no means of correcting for the video delay in the audio path. Video compression systems use 0.5 to 1.0 second or more of buffering in the process of encoding and decoding video. Although compression standards are quite clear about how to avoid lipsync errors, mistakes creep in. Lipsync errors can accumulate as the video and audio progress through an equipment chain.

It is desirable to be able to quantify the lipsync error. Further, it is desirable to quantify this error simply by observing a video/audio test sequence, without resorting to companion equipment.

One method in the prior art for indicating lipsync error is a test sequence wherein a rotating "clock hand" passes through the vertical position at the same time an audio event, such as a tone or click, is heard. This pattern helps determine that lipsync error has occurred, but does not quantify the error. Other products have been developed which include a frame synchronizer with an integrated audio delay, and have included a built-in test sequence to facilitate adjustment of the delay. Other proposed test sequences include a video element that flashes at the time of a tone; some equipment manufacturers have proposed companion test equipment (a light sensor and a microphone) to facilitate error measurement. But such companion equipment is, at times, inconvenient and depends primarily on a trial-and-error approach to correct lipsync error.

Accordingly, what would be desirable, but has not yet been provided, is a method for generating more numerically and visually discriminative test patterns for effectively and automatically quantifying losses in at least one of video and audio equipment.

SUMMARY OF THE INVENTION

The above-described problems are addressed and a technical solution is achieved in the art by providing a method for detecting and quantifying losses in at least one of video and audio equipment, comprising the steps of generating a test pattern; processing the test pattern through video equipment; and displaying the processed test pattern to a display to a viewer.

In one embodiment, the test pattern is indicative of video compression losses due to quantization, the test pattern including a periodic signal of at least one frequency distributed over a plurality of levels of amplitude in at least one of space and time such that, when a level of amplitude falls below a predetermined level, there is a cessation of contrast from a background pattern, the cessation of contrast being indicative of the step size of quantization. The periodic signal can be indicative of a plurality of frequencies and can be distributed over space. The test pattern can comprise a set of concentric rings of a two-dimensional sinusoidal pattern. The frequency of the test pattern can increase from the center of the test pattern to the Nyquist limit of the video sampling rate at the edges, the test pattern being modifiable in both amplitude and frequency. The amplitude of the test pattern can drop with angle. The step size of quantization can be indicated as a clock position.

In another embodiment the test pattern comprises at least two colors, wherein when a color transformation mismatch occurs in the system under test due to processing with incompatible video transmission standards, the resulting pattern displays a reduction in contrast between the at least two colors as a result of clipping. When one color is about 100% of its range and the other color is set to about the reciprocal of the gain increase to a color that occurs when a transformation mismatch is present in the video equipment. The at least two colors can be represented as a shape within a shape, or can be represented as adjacent shapes that flash in time. The present invention can be used for detecting a color mismatch transformation occurring between equipment being encoded or decoded with the Rec. 709 and Rec. 601 standards.

In a third embodiment, the test pattern has luma and chroma parts, the luma part of which remains substantially unchanged after a color transformation between a first and second video transmission standard, the test pattern being generated from a locus of color values that is the intersection between a first plane representing a first weighted sum of color values in a color space and a second plane representing a second weighted sum of color values in the color space, the first sum being weighted based on the first video transmission standard and the second sum being weighted based on the second video transmission standard. The test pattern can be based on finding the intersection of the planes formed by the equation $$Y=(R601*R)+(G601*G)+(B601*B) \text{ and } Y=(R709*R)+(G709*G)+(B709*B)$$

where R601, G601, B601 represent constant weights in a range between 0 and 1 for the colors red, green, and blue according to the Rec. 601 transmission standard, respectively, R709, G709, and B709 represent constant weights in a range between 0 and 1 for the colors red, green, and blue according to the Rec. 709 transmission standard, respectively, Y is a predetermined constant value of luma, and R, G, and B are red, green, and blue color space variables, respectively.

In a fourth embodiment, the test pattern is indicative of lipsync error, the test pattern comprising at least two distinct visual features that vary in time, and a corresponding audio sequence containing one or more changes in the sound that correspond to a change in one or more of the at least two distinct visual features. The at least two distinct visual features vary in time by means of a change in at least one of brightness, color, size, and shape. The at least two distinct video features for indicating lipsync error can be arranged in a linear pattern. The at least two distinct visual features that vary in time can be a plurality of video tick marks of one color, each tick mark changing in brightness for a predetermined amount of time in sequence, the audio sequence being an audio "tick" that, when video tick marks change in brightness, the audio tick mark is used by a viewer to gauge which video tick mark that changes in brightness is nearest in time to the audio tick mark, the nearest changing video lick mark indicating the number of frames of lipsync error.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 2:
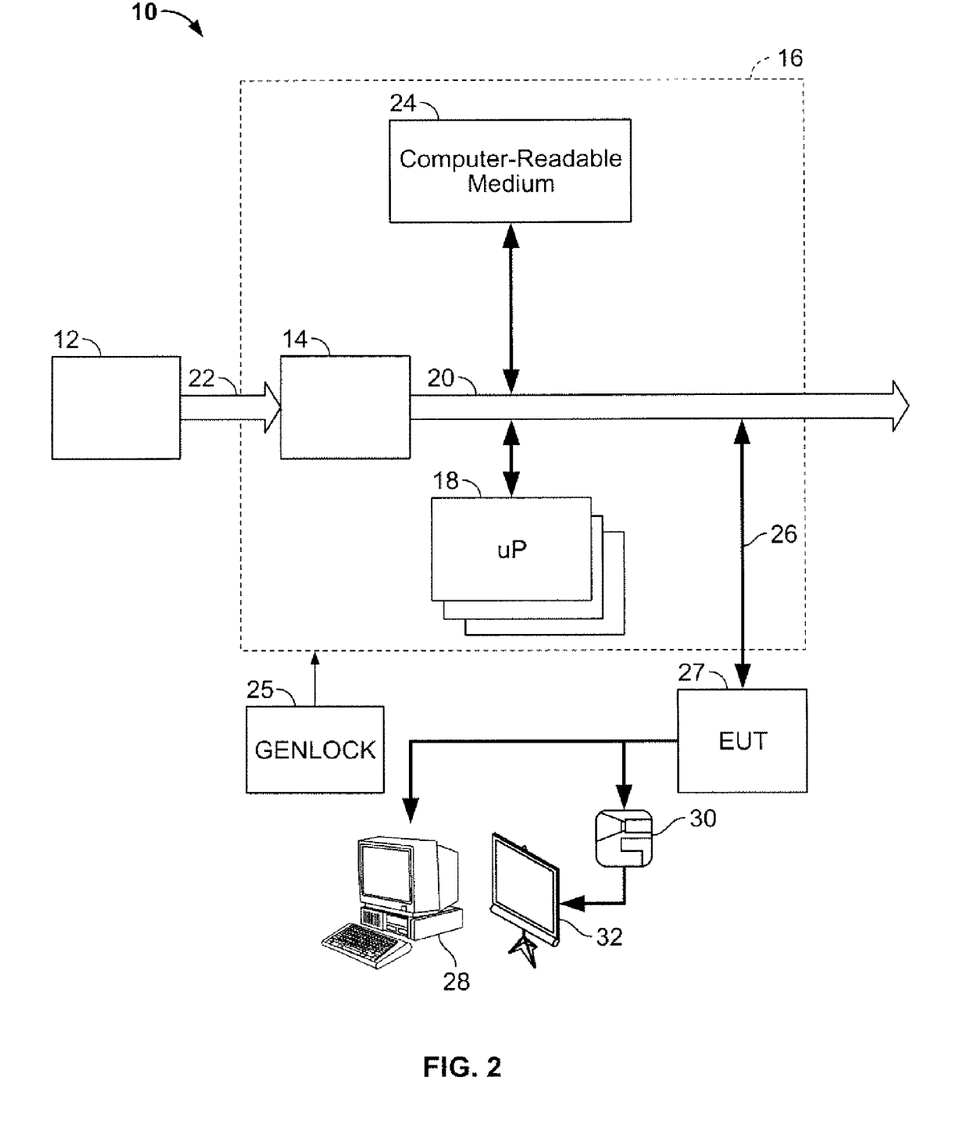
FIG. 2 is a block diagram of a hardware architecture of a system for producing test patterns, constructed in accordance with an embodiment of the present invention.

Referring now to FIG. 2, a test pattern generation system for detecting and quantifying losses in at least one of video and audio equipment is depicted, generally indicated at 10. By way of a non-limiting example, the system 10 includes a computing platform 16. The computing platform 16 may include a personal computer, work-station (e.g., a Pentium-M 1.8 GHz PC-104 or higher), or an embedded system comprising one or more single or multi-core processors 18 which includes a bus system 20 which connects the one or more processors 18 with the computer-readable medium 24. The computer readable medium 24 can also be used for storing the instructions of the system 10 to be executed by the one or more processors 18, including an operating system, such as the Windows or the Linux operating system, and at least one of video and audio data corresponding to test patterns to be discussed hereinbelow. The one or more processors 18 generate one or more video and/or audio test patterns from the computer-readable medium 24, thereby functioning as a test pattern generator. The computer readable medium 24 can include a combination of volatile memory, such as RAM memory, and non-volatile memory, such as flash memory, optical disk(s), and/or hard disk(s). A synchronization timing reference (Genlock) 25 can be supplied to the system 10 for synchronizing the system 10 to other equipment. A processed video data stream 26 can be stored temporarily in the computer readable medium 24 or fed in real time to the equipment under test 27 which in turn feeds a test pattern to a monitor 28 or projects the test pattern through a projector 30 on a projection screen 32. The test pattern can be one or more or a composite of all of the embodiments of test patterns to be described hereinbelow. The test pattern can provide video and optional audio indications of the degree of error introduced by the equipment under test 27 which may have compression or some other cause of distortion. The video/audio test patterns can provide direction indication of distortion and its quantification, or provide video and/or audio cues to a viewer.

In other embodiments of the system 10, the one or more processors 18 can be replaced by a digital signal processor, a field programmable gate array, and application-specific integrated circuit, or custom analog/digital electrical circuitry.

Figure 3:
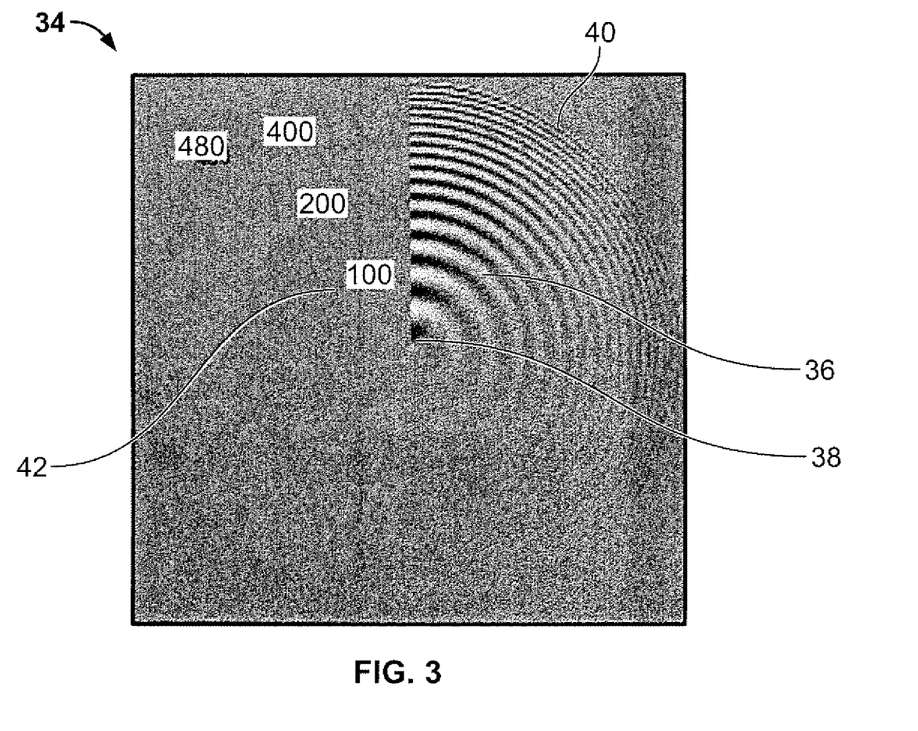
FIG. 3 is a diagram depicting a video test pattern for detecting and quantifying losses in one or more video images, constructed in accordance with a method of the present invention and the apparatus of FIG. 2.

FIG. 3 displays a video test pattern 34 for detecting and quantifying losses in video equipment, constructed in accordance with a method of the present invention. The test pattern 34 shows a visual representation of compression losses, e.g. due to quantization, spatially in two dimensions. The test pattern includes a set of concentric rings 36, preferably a two-dimensional sinusoidal pattern, whose frequency increases from the center 38 of the test pattern 34 to as much as the Nyquist limit of the video sampling rate at the edges 40 of the test pattern 34.

The test pattern 34 can be modified in both amplitude and frequency. The frequency at the edges 40 is the Nyquist limit, and in a preferred embodiment, the frequency increases smoothly with equally-spaced doublings starting at the center 38 at some non-zero value, so that each octave represents an equal distance along a radius (e.g., 100 lines, 200 lines, 400 lines per unit height, as shown). Slight changes can be made in the background level for each octave so that a viewer of the test pattern can estimate frequencies, which can be labeled in units of lines per picture height. In another embodiment, the frequency can drop towards the center, i.e., the reverse of the preferred embodiment.

Figure 4:
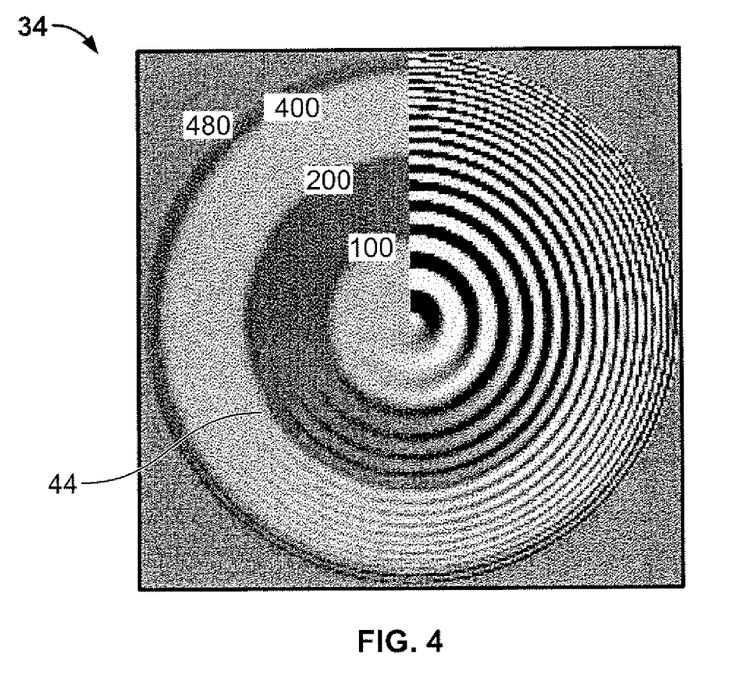
FIG. 4 is a diagram depicting a video test pattern similar to the test pattern of FIG. 3, wherein the sine wave patterns stops abruptly at the 8 o'clock position, indicating 8-bit performance from 0 to the Nyquist limit.

FIG. 4 demonstrates the effects of distortions due to compression which reveals itself as bit-level of performance or alternatively expressed as the step size of quantization. The amplitude of the test pattern 34 is not constant but drops with angle. In the present embodiment, the bit-level of performance is indicated as a clock position 44. If the viewer can see the two-dimensional sine wave at the 6 o'clock position, then the system under test has at least 6-bit performance (64 levels). If the viewer sees the sine wave at the 8 o'clock position, the system under test can resolve 8 bits, or 256 levels. As the encoder quality varies, so does the angle where the sine wave vanishes. In the pattern shown in FIG. 4, the sine wave patterns stops abruptly at the 8 o'clock position, indicating 8-bit performance from 0 to the Nyquist limit.

Figure 5:
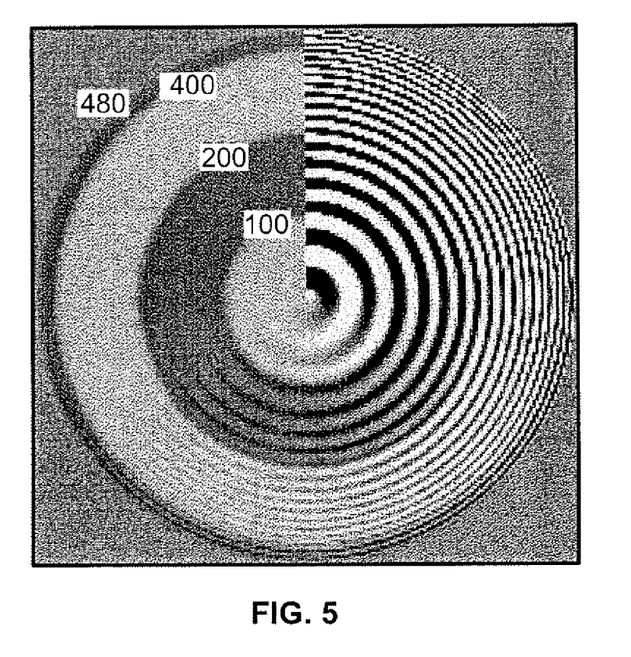
FIG. 5 is a diagram depicting a video test pattern similar to the test pattern of FIG. 3 as would be produced after processing with a resulting pattern for JPEG compression using Adobe Photoshop™ with a "quality" quality setting of "9"

FIG. 5 shows a resulting pattern for JPEG compression as would be produced using Adobe Photoshop™. Adobe Photoshop™ has a "quality" parameter that can be varied from 1 to 12. FIG. 5 shows a contrast-enhanced output pattern for a quality setting of "9." The quality of compression can be interpreted as 8 bits out to 200 lines, but tapering off to 7 bits at 400 lines.

The test pattern of FIGS. 3-5 is not strictly limited to a spatial distribution of a two dimensional sinusoid that varies in amplitude and frequency. In the more general case, the test pattern can include a periodic signal of at least one frequency distributed over a plurality of levels of amplitude in at least one of space and time such that, when amplitude falls below a predetermined level, there is a cessation of contrast from a background pattern, the cessation of contrast being indicative of the step size of quantization.

Figure 6:
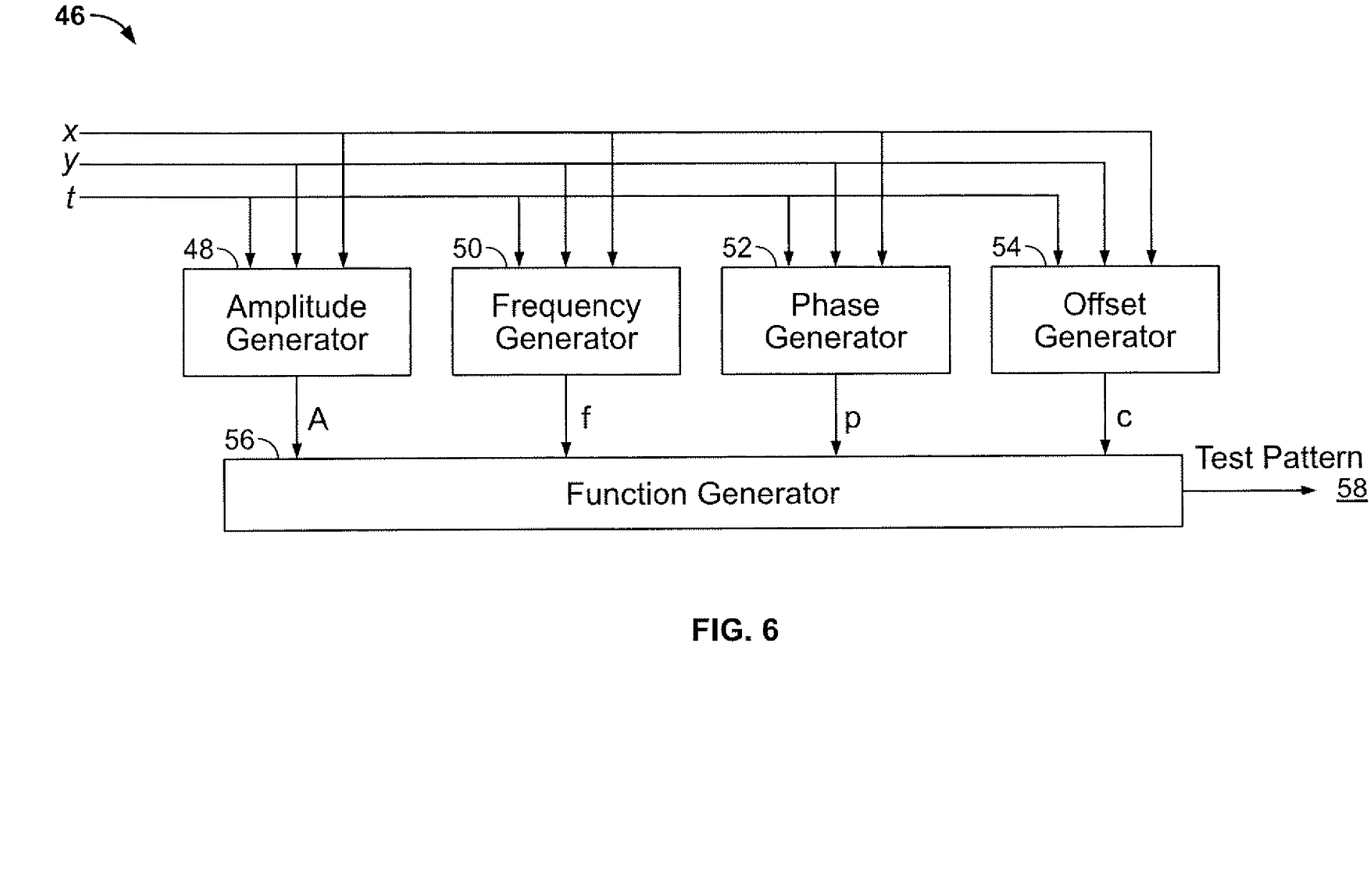
FIG. 6 is a block diagram of an apparatus for generating the test patterns of FIGS. 3-5, constructed in accordance with an embodiment of the present invention.

FIG. 6 is a block diagram of an apparatus 46 that can be implemented by the system 10 of FIG. 2 for generating the test patterns of FIGS. 3-5, constructed in accordance with an embodiment of the present invention. The apparatus 46 includes a plurality of parameter generators 48, 50, 52, 54 which feed their outputs to a function generator 56 to generate a test pattern 58 based on the function is A cos(f÷p)+c, where A, f, p, and c are the intermediate outputs of the parameter generators 48, 50, 52, 54, and stand for amplitude A, frequency f, phase p, and offset c, respectively, to be described hereinbelow. The inputs to the apparatus 46 are x, y, and t. The x and y inputs indicate the spatial position of a given pixel, and the t input indicates the temporal position, e.g., frame number. The four parameters A, f, p, and c are then used by the function generator 56 to create a brightness value for each pixel.

The amplitude generator 48 converts the x and y values to a vector angle, which then outputs a value that is 1.0 at the "noon" position and drops exponentially by half for each 1/12 of a full revolution, that is, for each 'hour' of the clock face. At the 1:00 position, the amplitude generator 48 outputs 0.5, at 2:00 it outputs 0.25, at 3:00 it outputs 0.125, and so on. The output of the amplitude generator 48 may be a smooth function of the angle, or it may be stepped.

The frequency generator 50 converts the x and y values to a distance from the center of the test pattern 58 representative of a frequency value. In the preferred embodiment, the frequency rises exponentially as the distance from the center increases, for example, starting at 50 lines per picture height (LPH) at the center, then 100 LPH at certain distance d from the center, then 200 LPH at 2d, then 400 LPH at 3d, and so on. The scale factor d is chosen so that the frequency reaches the Nyquist limit at the edge of the pattern.

The phase generator 52 creates its output in proportion to time t. In the preferred embodiment, p is independent of x and y, and t is the frame number. The output of the phase generator 52 is $p=t/N*2*\pi$, where N is the number of frames in a repeat period. For example, if the frame rate is 30 fps, and the repeat period is two seconds, $N=2*30=60$. This causes the test pattern to appear to move, and this movement is important in detecting losses in motion-compensating compression systems.

The offset generator 54, in a preferred embodiment, is constant and independent of x, y and t. The offset can be as large as one half of the full range, e.g., 128 for an 8-bit system. The offset produces a constant background on which to look for variations. Another benefit of the offset is that it allows the largest possible amplitude without clipping or limiting the amplitude of the test pattern. However, in a given cycle of the output, all of the bits will be changing as the signal moves above 128 (1000 0000) and then less than 128 (e.g. 127=0111 1111). Loss of bits by simple truncation would not result in a constant value, but alternate between 1000 0000× and 0111 1111×. Thus, the loss of, for example, the LSB would not be apparent, since the values would still be changing, even though it had been alternating between 127 and 128. If the two values are 128 and 129 (1000 0000 and 1000 0001) then losing the LSB results in a constant value: 1000 0000×. If the amplitude is larger e.g. ±4 levels, the offset must be such that only the bottom few bits are changing. The offset should be one-half of the amplitude, and is thus a function of x and y. The offset generator output would then be the same as the amplitude generator output followed by a divide-by-2 operation.

Additionally, the offset generator 54 may be used as a kind of "scale" indicator, allowing the viewer to distinguish the frequency octave. The octave nearest the center may be indicated by slightly increasing the offset, the next octave by slightly decreasing the offset, and so one. In a similar way, amplitude bands may be indicated: the "pie slice" between "noon" and "one o'clock" reverses the offset used to indicate the octave (increases become decreases and decreases become increases); the slice between 1:00 and 2:00 is not reversed; the slice between 2:00 and 3:00 is reversed, and soon. Note that varying the offset with the amplitude reduces the maximum amplitude that is possible by at least half, since the MSB does not change.

The frequency and amplitude bands are generally indicated by modifying the luminance offset, but this may produce compression artifacts that are may be distracting to the observer. To overcome this problem, in a preferred embodiment, the zone plate information can be carried in the luminance (Y) channel, while the frequency and amplitude information is carried in the color difference channel(s) U and/or V.

For displaying a test pattern that indicates distortions produced by a color transformation mismatch, according to another embodiment, a signal with two or more distinct color values is chosen such that, when a color transformation mismatch occurs, the resulting pattern would show that one or more of the two or more distinct color values would exceed the normal 0% to 100% range of that color. In a video system that enforces the range to be between 0 and 100%, values for color exceeding that range would be modified (i.e., clipped), and the distinction between the two or more colors would be reduced or eliminated. This loss of distinction would be an indication to a viewer that a color transformation mismatch has occurred.

Figure 7A:
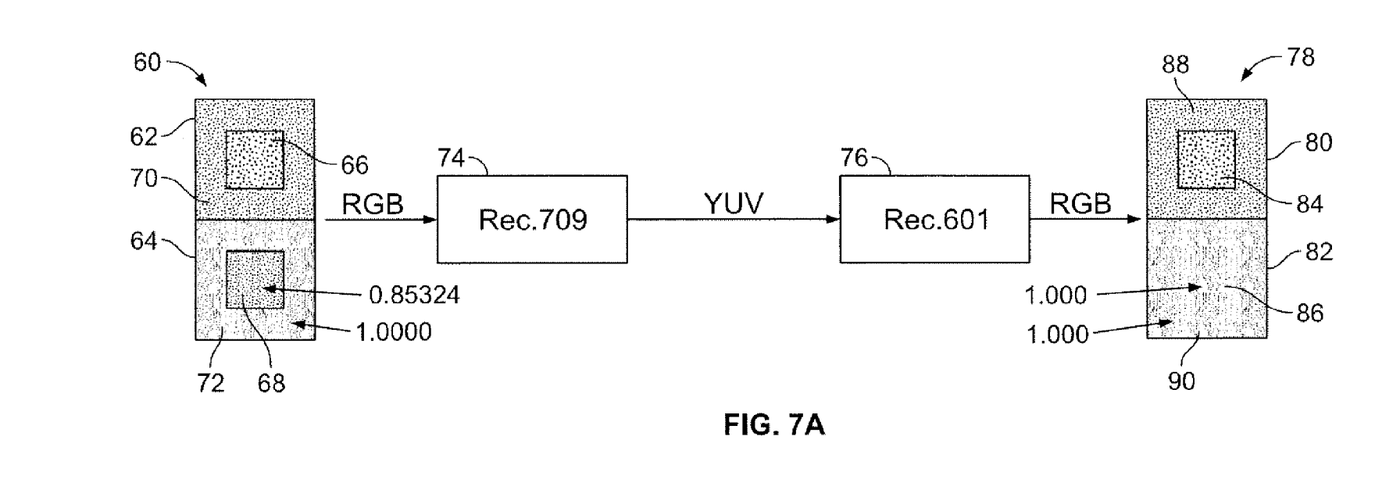
FIG. 7A is a diagram depicting a video test pattern used to detect a forward color transformation mismatch for the Rec. 709 and Rec.601 video compression standards.
Figure 7B:
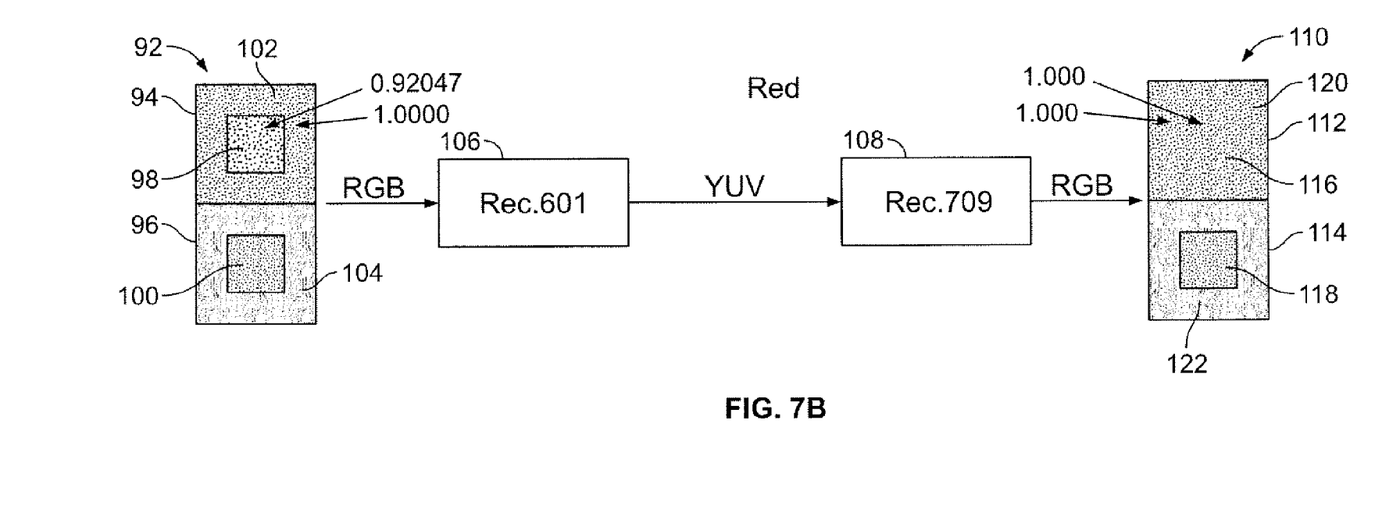
FIG. 7B is a diagram depicting a video test pattern used to detect a reverse color transformation mismatch for the Rec. 709 and Rec.601 video compression standards.

FIGS. 7A and 7B show test patterns of the present method used to detect a forward color transformation mismatch and a reverse color transformation mismatch, respectively, for Rec. 709 and Rec. 601. In FIG. 7A there is shown, at left, a color test pattern 60 before encoding/decoding comprising a pair of color coded rectangular boxes 62 (red), 64 (green), representing two of the three RGB colors, each of the boxes 62, 64 having an inner box 66, 68, a pair of rectangular rings 70, 72 being formed therebetween. In FIG. 7A there is also shown a Rec.709 encoding block 74, a Rec.601 decoding block 76, and, at right, a color test pattern 78 after encoding/decoding comprising a pair of color coded rectangular boxes 80 (red), 82 (green), representing two of the three RGB colors, each of the boxes 80, 82 having an inner box 84, 86, a pair of rectangular rings 88, 90 being formed therebetween. The present invention is not limited to square or rectangular test patterns, but would work equally well with other shapes, such as circles, triangles, etc. The outer rectangular rings 72, 74 represent a specific color at its maximum value of 100% or 1.0000, while the inner boxes 66, 68 display the current color of that color type of at least an image patch before encoding. In the example shown in FIG. 7A, the inner green box 66 has a value of 0.85324. The video patch is then encoded with the Rec.709 encoding block 74, to produce YUV. The YUV encoded patch is then decoded with the Rec.601 decoding block 76. The boxes 80 (red), 82 (green) of the test pattern 78 at right represent the results after encoding/decoding. When encoded with Rec.709 and then decoded with Rec.601, the corresponding green values become 1.172 and 1.000, respectively. After limiting to a range of 0 to 100%, the values in box 68 and ring 74 become indistinguishable at values of 1.0000 and 1.0000.

The pair of green values in box 68 and ring 74 is suitable for the forward encoding/decoding steps, but is unsuitable for reverse encoding with Rec.601 and decoding with Rec.709. Instead, the red boxes/rings are used for this purpose. Referring now to FIG. 7B there is shown, at left, a color test pattern 92 before encoding/decoding comprising a pair of color coded rectangular boxes 94 (red), 96 (green), representing two of the three RGB colors, each of the boxes 94, 96 having an inner box 98, 100, a pair of rectangular rings 102, 104 formed therebetween. In FIG. 7B there is also shown a Rec.609 encoding block 106, a Rec.709 decoding block 108, and, at right, a color test pattern 110 after encoding/decoding comprising a pair of color coded rectangular boxes 112 (red), 114 (green), representing two of the three RGB colors, each of the boxes 112, 114 having an inner box 116, 118, a pair of rectangular rings 120, 122 formed therebetween. In the example shown in FIG. 7B, the inner red box 112 has a value of 1.000 and the outer red ring 120 has a value of 1.000. The video patch is then encoded with the Rec.601 encoding block 106, to produce YUV. The YUV encoded patch is then decoded with the Rec.709 decoding block 108. The boxes 112 (red), 114 (green) at right represent the results after encoding/decoding. When encoded with Rec.609 and then decoded with Rec.709, the corresponding red values become 1.086 and 1.000, respectively. After limiting to a range of 0 to 100%, the values in box 116 and ring 120 become indistinguishable at values of 1.0000 and 1.0000.

These color matrix transform encode/decode mismatch patterns are detectable by visual inspection, even by someone who cannot easily distinguish colors. The present invention is not strictly limited to displaying a shape with a shape, but extends to the more general display at least two colors that are at least partially adjacent in at least one of space and time, wherein when a color transformation mismatch occurs, the resulting pattern displays a reduction in contrast between the at least two colors. For example, the test pattern can include shapes that are at least partially adjacent that flash in time.

Figure 8:
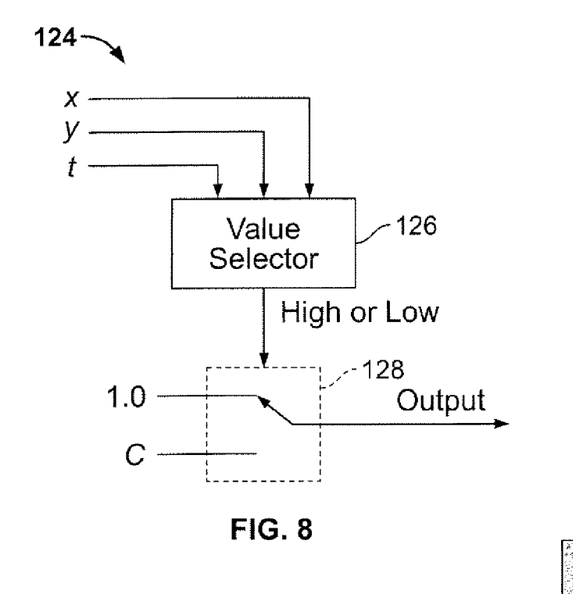
FIG. 8 is a block diagram of an apparatus for generating one "saturated" color channel of the test patterns of FIGS. 7A and 7B.

FIG. 8 is a block diagram of an apparatus 124 that can be implemented by the system 10 of FIG. 2 for generating one "saturated" color channel of the above-described pattern of FIGS. 7A and 7B. In the present embodiment, the other two color channels are both zero. The inputs to the apparatus 124 are x, y, and t. The x and y inputs indicate the spatial position of a given pixel, and the t input indicates the temporal position, e.g., frame number. The four parameters are then used by the value selector 126 to create a brightness value for each pixel. The apparatus 124 also includes a block 128 which selects one of two multiplication constants 1.0 or c, with which to multiply the x or y input values.

The value selector 126 selects c if x is greater than X1 and less than X2, where X2>X1, and y is greater than Y1 and less than Y2, where Y2>Y1. Otherwise value selector 126 selects 1.0. X1, X2, Y1, and Y2 are constants. This arrangement causes c to be selected in block 130 when a pixel is within a rectangular sub-region of a certain region of pixels. The t parameter may be used, for example, to periodically stop selecting c entirely for certain frames, causing the sub-region to appear to "blink".

The value c may be determined by first determining the increase of gain in a certain color channel caused by encoding with one matrix and decoding with another. Since this gain is an increase, it will be greater than 1.0. The value of c is then the reciprocal of said increased gain.

For example, encoding 100% red with Rec. 601 gives YCbCr values of [0.299, −0.168736, 0.5]. Decoding these with the Rec. 709 matrix gives not 1.0 as the Rec. 601 matrix would, but 1.08640. The value of c is 1/1.08640, or 0.920471. This value is the lowest value that will still result in clipping at the decoder, rendering it equal to the surrounding value of 1.0, and thus indistinguishable from it.

For the reverse problem (detecting when a Rec.709-encoded signal is decoded with Rec.601) the red channel does not experience a gain increase, but the green channel does, so the green channel is selected. Encoding 100% green with Rec. 709 gives YCbCr values of [0.7152, −0.385428, −0.454153]. Decoding these with Rec. 601 gives not 1.00, but 1.1722, and the value of c that should be used is its reciprocal: 0.85312. This value is the lowest value that will still result in clipping at the decoder, rendering it equal to the surrounding value of 1.0, and thus indistinguishable from it.

In another embodiment of the present invention, RGB values can be generated with luma and chroma parts, the luma part of which remains unchanged unchanged after having been transcoded from one domain to another, i.e., following a transcoding operation between two specific Y'CbCr colorspaces. An iso-luminant test pattern can be generated for transformations between the Rec.601 standard and the Rec.709 standard from the results of the following analysis. The present invention is not strictly limited to the Rec. 601 and Rec. 709 standards or R-G-B color spaces, and the analysis can be applied in a similar fashion to others video transmission standards and color spaces (e.g., yellow-cyan-magenta) as would be understood by one skilled in the art.

Given Y and one of the R, G, B values, the other two of the RGB values are determined such that $$Y = (R601*R) + (G601*G) + (B601*B) \text{ and } Y = (R709*R) + (G709*G) + (B709*B)$$

where R601, G601, B601 are constant weights between 0 and 1 based on the Rec. 601 standard, respectively, R709, G709, and B709 are constant weights between 0 and 1 based on the Rec. 709 standard, respectively, and R, G, and B are red, green, and blue variables whose range is limited to 0 to 1.

For a given value of Y, each equation represents a plane in RGB space. For the two standards in question (Rec.601 and Rec.709), these planes intersect, forming a line in RGB space. Points on this line, that is, RGB triplets corresponding to points on this line, have the same luma value in both standards.

There are three variables (RGB) but only two equations. One of the variables needs to be chosen along with the chosen Y value, and then the other two variables may be derived. The choice for both Y and one of the RGB values should lie between 0 and 1, but some combinations can result in the other two variables falling outside the range 0 to 1. (The range may be scaled to 0 to N, such as N=255, or M to N, where M is 16 and N is 235, for example.) Because the blue coefficients (B601 and B709) are both smaller than any of the others, the B variable has very little influence over the final Y value. Choosing a large value of G and a low value for Y, for instance, would result in a negative value for B, which is not valid.

For convenience invalid values can be avoided by choosing B and Y and then deriving R and G. For Y=0.5 and B varying between 0 and 1, the resulting R and G values will always be valid. Other means to assure valid values will occur to those of ordinary skill in the art.

Figure 9:
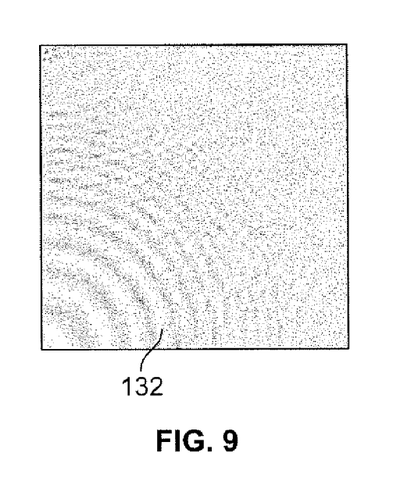
FIG. 9 is a diagram depicting an iso-luminant test pattern, constructed in accordance with an embodiment of the present invention.

Table 1 is a table of values demonstrating 11 values of blue and the corresponding values of red and green that result in the luma values of 0.5 for both Rec.601 and Rec.709. When the blue signal is a zone plate and Y is set to 0.5, the RGB image that results is shown in FIG. 9, with Y stripes having the reference number 132. Measurements may be made using the test pattern with a confidence that the luma values are independent of whether the pattern has been transcoded to another colorspace.

TABLE 1

| Red | Green | Blue | Y601 | Y709 |
|---|---|---|---|---|
| 0.719832 | 0.485128 | 0.000000 | 0.500000 | 0.500000 |
| 0.675865 | 0.488103 | 0.100000 | 0.500000 | 0.500000 |
| 0.631899 | 0.491077 | 0.200000 | 0.500000 | 0.500000 |
| 0.587933 | 0.494051 | 0.300000 | 0.500000 | 0.500000 |
| 0.543966 | 0.497026 | 0.400000 | 0.500000 | 0.500000 |
| 0.500000 | 0.500000 | 0.500000 | 0.500000 | 0.500000 |
| 0.456034 | 0.502974 | 0.600000 | 0.500000 | 0.500000 |
| 0.412067 | 0.505949 | 0.700000 | 0.500000 | 0.500000 |
| 0.368101 | 0.508923 | 0.800000 | 0.500000 | 0.500000 |
| 0.324135 | 0.511897 | 0.900000 | 0.500000 | 0.500000 |
| 0.280168 | 0.514872 | 1.000000 | 0.500000 | 0.500000 |

Figure 10:
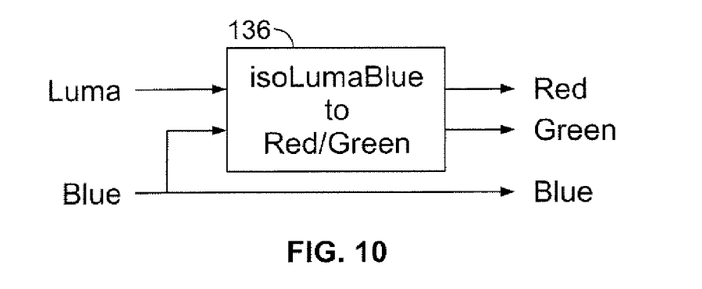
FIG. 10 is a block diagram of an apparatus for generating an iso-luminant test pattern for transformations between the Rec.601 standard and the Rec.709 standard, constructed in accordance with an embodiment of the present invention.

FIG. 10 is a block diagram of an apparatus 134 that can be implemented in by the system 10 of FIG. 2 for generating an iso-luminant test pattern for transformations between the Rec.601 standard and the Rec.709 standards, constructed in accordance with an embodiment of the present invention. FIG. 10 shows a processing block 136 that processes a value of blue and a value of the desired luma and produces corresponding red and green values. These red, green, and the original blue value, when summed according to the luma coefficients of either the ITU-601 or ITU-709, produces the same luma value as presented to the processing block 136.

The above process may be implemented in two steps. The first step involves calculating the red value from the blue and luma values, and the second step involves calculating the green value from the blue and luma values. The second step can use the result of the first step as a shortcut. An implementation in C code for the first step is as follows:

```
float isoLumaRed( const float blue, const float luma )
{
const float r709 = .2126;
const float b709 = .0722;
const float g709 = .7 152;
const float r601 = .299;
const float b601 = . 114;
const float g60 1 = .587;
return (luma*(1/g709 –1/g601 ) – ((b709/g709)–(b601 /g601))*blue) I
(r709/g709 – r601/g601);
}
```

An implementation in C code for the second step is as follows:

```
    float isoLumaGreen( const float blue, const float luma )
    {
    const float r709 = .2126.
    cons t float b709 = .0722;
    const float g709 = .7152;
    return
    –((r709/g709)* isoLumaRed( blue, luma) + (b709/g709)*blue –
    luma*(1/g709));
    }
```

Note that in this embodiment the second step (isoLumaGreen) incorporates the first step (isoLumaRed).

Figure 11:
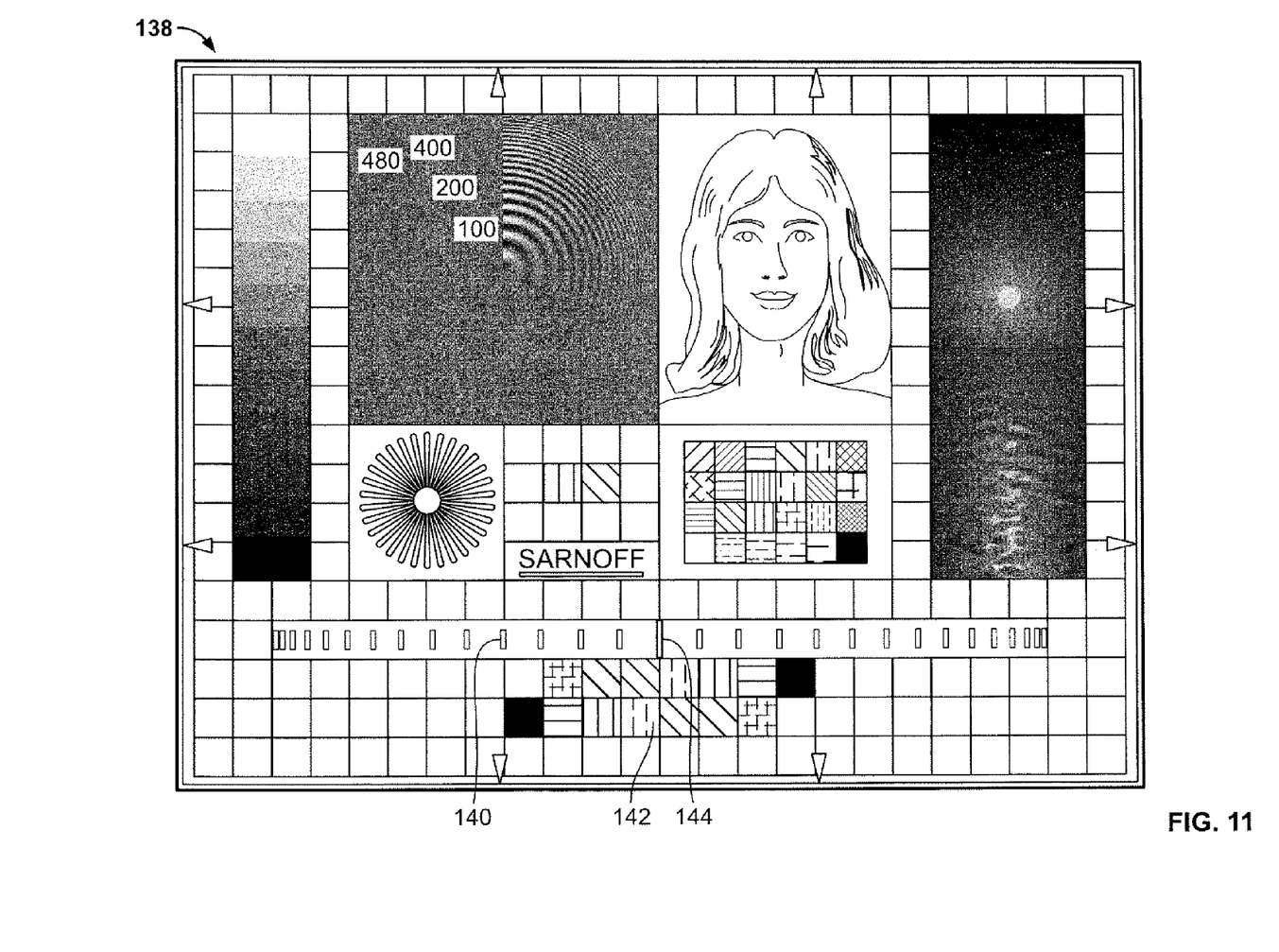
FIG. 11 is a diagram depicting a video test pattern for indicating lipsync error, constructed in accordance with an embodiment of the present invention.
Figure 12:
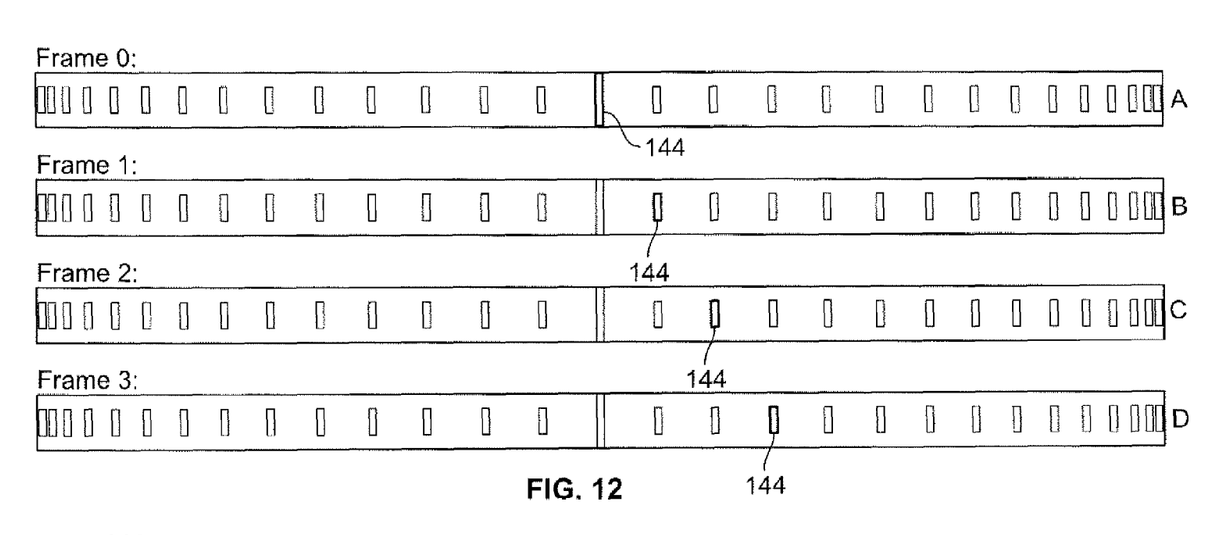
FIGS. 12A-12D show portions of the video test pattern of FIG. 11 in which a "video tick" moves from left to right.

According to another embodiment of the present invention, lipsync error can be detected and quantified as a video and audio test sequence that includes a plurality of visual indicators. FIG. 11 shows an example composite test pattern 138 comprising a video frame sequence for indicating lipsync error, constructed in accordance with an embodiment of the present invention. The video frame sequence has two or more distinct visual features that vary in time, each of the features appearing in either a primary form or in one of one or more secondary forms in any given frame, and a corresponding audio sequence containing one or more changes in the sound that correspond to a change in form of one or more of the video features. The relevant portion of the composite test pattern 138 is a horizontal row of gray tick marks 140 (i.e., the "primary form"), corresponding to each frame being currently viewed in a two-second period, just above the color bar pattern 142. The first frame, frame 0, has its bright tick mark 144 at the center of the row. Note that the center tick mark 144 is brighter (i.e., the "secondary form") and larger than the other tick marks. The "bright" tick mark 144 "moves" from center to the right as shown in a series of frames illustrated in FIGS. 12A-12D. The "bright" tick mark 144 of FIGS. 11 and 12A-12D reverses and moves from the right side to the far left side, reverses and moves toward the center again so as to give the appearance of smooth motion. The final frame's bright mark is one mark to the left of center, so that when the sequence is looped, motion appears to be continuous.

The corresponding audio sequence contains a "tick" sound in both left and right channels at the time of frame 0. (It has a different sounding tick in the right channel when the moving tick reaches the right side, and a similar tick in the left channel when the tick reaches the left side. These left and right ticks allow detection of a left-right channel reversal error).

To detect lipsync offset, a viewer focuses on a flashing video tick mark and listens for the audio tick. The viewer continues to observe the bright video tick mark and listens to the audio tick until a decision is made as to whether the audio tick precedes or follows the flash of the video tick mark (or if it is in sync). If the video and audio tick marks are not in sync, another video tick mark is chosen that appears to be more closely in sync. This process is repeated until the viewer finds the closest video tick mark that flashes when the audio tick is heard. The number of tick marks from the center tick indicates the number of frames that the audio and video are offset from each other.

Alternative forms for indicating a difference between primary and secondary forms of the video indicators of lipsync error include a difference in brightness and/or color, size, and/or shape or different geometric shapes such as rectangles, triangles, or circles. The distinct video features for indicating lipsync error can be arranged in a pattern such as a linear pattern. The form changes of spatially-adjacent features can be temporally adjacent.

Figure 13:
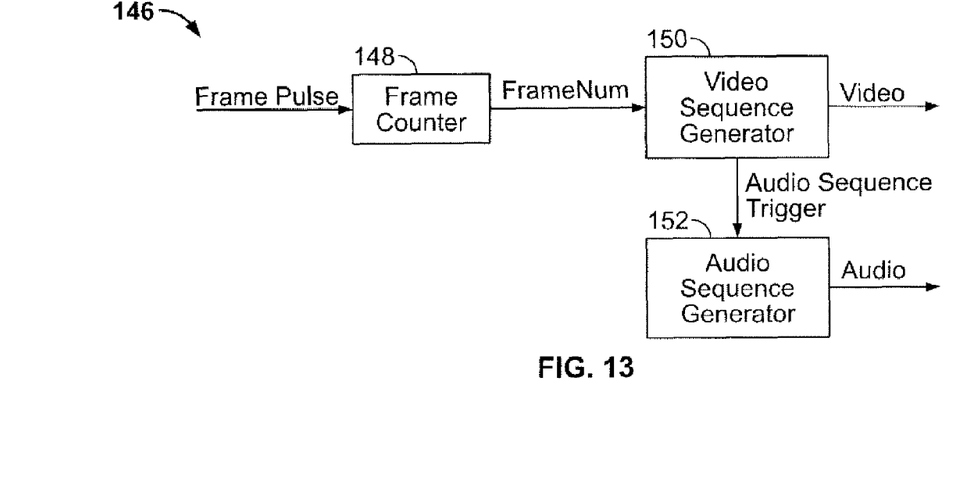
FIG. 13 is a block diagram of an apparatus generating a video/audio "test pattern" for detecting and evaluating lipsync error, constructed in accordance with an embodiment of the present invention.

FIG. 13 is a block diagram of an apparatus 146 that can be implemented with the system 10 of FIG. 2 for generating a video/audio "test pattern" for detecting and evaluating lipsync error, constructed in accordance with an embodiment of the present invention. The apparatus 146 creates synchronized audio and video sequences. The apparatus 146 includes a frame counter 148, a video sequence generator 150, and an audio sequence generator 152. The input frame pulse occurs once per video frame, and the frame counter 148 counts the frame pulses and outputs a value that increases by one for each frame pulse. A frame number corresponding to the value of the frame counter 148 is fed to the video sequence generator 150. The video sequence generator 150 creates a video image sequence according to the code listed hereinbelow and triggers the audio sequence generator 152 to start or modify its output at the video frame corresponding to an "in sync" condition.

The following computer code describes the process by which the lipsync video data are created according to the apparatus of FIG. 13.

```
forEachNew( frameNum ) /* get the new frame number from the input */
{
 frameRate = 30; /* frames per second */
 background = 96;
 fullscale = 255;
 ticWidth = 3;
 /* create the output image array and till with gray */
 CreateArray( tmp, width, height );
 fill( tmp, background );
 /* create a dim tic. This will be copied to several places in the output. */
 CreateArray( tic, ticWidth, height/2 );
 fill( tic, fullscale/2 );
 /* place static, dim tick marks, one for each frame in one second */
 for( ii = 0; ii < frameRate; ii++ )
 {
  position = width / 2 * cos( PI * ii / frameRate );
  position += width/2; /* 'zero' is in the middle of the array */
  position –= ticWidth/2; /* make it centered on the position
  horizontally */
  paste( tic, tmp, position, height / 4 );
  /* if this is the center tic, make it taller */
  if (ii == frameRate/2 )
  {
   paste( tic, tmp, position, 0 ); /* more on top */
   paste( tic, tmp, position, HEIGHT( tic ) ); /* more on bottom */
  }
 }
}
```

-continued

```
/* make and place a single bright pointer tick. This is
    the one that will appear to move.
 */
 CreateArray( tic, ticWidth, height/2 );
 fill( tic, fullscale );
 position = width / 2 * sin( 1 * PI * frameNum / frameRate );
 position += width/2; /* (same as code above, q.v.) */
 position -= ticWidth/2;
 paste( tic, tmp, position, height /4 ); /* place the bright tic */
 /* if this is the center tic, make it taller. Also, trigger the audio click! */
 if ( frameNum % frameRate == 0 )
 {
   paste( tic, tmp, position, 0 ); /* add to top */
          paste( tic, tmp, position, HEIGHT( tic ) ); /* add to bottom */
          /* cause the audio generator to start
             playing or modify its output every other second, as
             bright tic moves left to right (but not as it moves
             right to left).
          */
          if ( frameNum % ( 2 * frameRate ) == 0 )
          sendAudioTriggerPulse( );
 }
 outputThisFrame( tmp );
}
```

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for helping a user to detect the magnitude of a synchronization error in video equipment and audio equipment, comprising the steps of:
    generating a test pattern;
    processing the test pattern through video and audio equipment to obtain a processed test pattern;
    outputting to the user an audio sequence from the processed test pattern, comprising a series of sounds occurring over time; and
    displaying to the user, on an interactive display, a plurality of visual features from the processed test pattern comprising a first visual feature positioned at a first location on the display and a plurality of additional visual features positioned at a plurality of corresponding locations patterned around the first visual feature, each of the additional visual features having a visual appearance changing in form,
    wherein a location on the interactive display of a matching visual feature whose form changes in sync with the output of the series of sounds indicates the magnitude of the synchronization error between the video and audio equipment as a function of the distance between the first location and the location on the interactive display of the matching visual feature.

2. The method of claim 1, wherein the plurality of visual features vary in time by means of a change in at least one of brightness, color, size, and shape.

3. The method of claim 2, wherein the plurality of visual features for indicating the synchronization error are arranged in a linear pattern.

4. The method of claim 3, wherein the plurality of visual features are a plurality of video tick marks, each tick mark changing in brightness for a predetermined amount of time in sequence, and the series of sounds being a series of audio "ticks".

5. The method of claim 1 wherein the test pattern that is generated is indicative of video compression losses due to quantization and comprises a periodic signal of at least one frequency distributed over a plurality of levels of amplitude in at least one of space and time such that, when a level of amplitude falls below a predetermined level, there is a cessation of contrast from a background pattern, the cessation of contrast being indicative of a step size of quantization.

6. The method of claim 5, wherein the periodic signal is indicative of a plurality of frequencies, the test pattern comprises a set of concentric rings of a two-dimensional sinusoidal pattern, the amplitude of the test pattern drops with angle and wherein the step size of quantization is indicated as a clock position.

7. The method of claim 1, wherein the test pattern that is generated comprises luma and chroma parts, the luma part of which remains substantially unchanged after a color transformation between a first and second video transmission standard, the test pattern being generated from a locus of color values that is the intersection between a first plane representing a first weighted sum of color values in a color space and a second plane representing a second weighted sum of color values in the color space, the first sum being weighted based on the first video transmission standard and the second sum being weighted based on the second video transmission standard, and
    wherein generating the test pattern is based on finding an intersection of planes formed by the equation $$Y=(R601*R)+(G601*G)+(B601*B) \text{ and } Y=(R709*R)+(G709*G)+(B709*B)$$

where R601, G601, B601 represent constant weights in a range between 0 and 1 for the colors red, green, and blue according to the Rec. 601 transmission standard, respectively, R709, G709, and B709 represent constant weights in a range between 0 and 1 for the colors red, green, and blue according to the Rec. 709 transmission standard, respectively, and Y is a predetermined constant value of luma, and R, G, and B are red, green, and blue color space variables, respectively.

8. The method of claim 1, wherein the test pattern that is generated comprises at least two colors, wherein when a color transformation mismatch occurs due to processing with incompatible video transmission standards, the resulting pattern displays a reduction in contrast between the at least two colors.

9. The method of claim 8, wherein, when a color transformation mismatch occurs, the at least two colors become substantially indistinguishable after passing through one of the video equipment and the display,
    wherein when one color of the at least two colors is about 100% of its range and another color of the at least two colors is set to about the reciprocal of the gain increase to that color that occurs when a transformation mismatch is present in the video equipment, and
    wherein the at least two colors that are at least partially adjacent in at least one of space and time in the test pattern are represented as one of a shape within a shape or as adjacent shapes that flash in time.

10. A system for detecting and quantifying a synchronization error in video equipment and audio equipment, comprising:
    a processor being configured for:
        generating a test pattern;
        processing the test pattern through video and audio equipment to obtain a processed test pattern;

outputting to a user an audio sequence from the processed test pattern, comprising a series of sounds occurring over time; and displaying to the user, on an interactive display, a plurality of visual features from the processed test pattern comprising a first visual feature positioned at a first location on the display and a plurality of additional visual features positioned at a plurality of corresponding locations patterned around the first visual feature, each of the visual features having a visual appearance changing in form, wherein a location on the display of a matching visual feature whose form changes in sync with the output of the series of sounds indicates the magnitude of the synchronization error between the video and audio equipment as a function of the distance between the first location and the location on the display of the matching visual feature.

11. The method of claim 1 wherein the test pattern that is generated is indicative of video compression losses due to quantization and comprises a periodic signal of at least one frequency distributed over a plurality of levels of amplitude in at least one of space and time such that, when a level of amplitude falls below a predetermined level, there is a cessation of contrast from a background pattern, the cessation of contrast being indicative of a step size of quantization.

12. The system of claim 11, wherein the periodic signal is indicative of a plurality of frequencies, the test pattern comprises a set of concentric rings of a two-dimensional sinusoidal pattern, the amplitude of the test pattern drops with angle and the step size of quantization is indicated as a clock position.

13. The system of claim 10, wherein the test pattern that is generated comprises luma and chroma parts, the luma part of which remains substantially unchanged after a color transformation between a first and second video transmission standard, the test pattern being generated from a locus of color values that is the intersection between a first plane representing a first weighted sum of color values in a color space and a second plane representing a second weighted sum of color values in the color space, the first sum being weighted based on the first video transmission standard and the second sum being weighted based on the second video transmission standard, and wherein generating the test pattern is based on finding an intersection of planes formed by the equation $$Y=(R601*R)+(G601*G)+(B601*B) \text{ and } Y=(R709*R)+(G709*G)+(B709*B)$$

where R601, G601, B601 represent constant weights in a range between 0 and 1 for the colors red, green, and blue according to the Rec. 601 transmission standard, respectively, R709, G709, and B709 represent constant weights in a range between 0 and 1 for the colors red, green, and blue according to the Rec. 709 transmission standard, respectively, and Y is a predetermined constant value of luma, and R, G, and B are red, green, and blue color space variables, respectively.

14. The system of claim 13, wherein the test pattern that is generated comprises at least two colors, wherein when a color transformation mismatch occurs due to processing with incompatible video transmission standards, the resulting pattern displays a reduction in contrast between the at least two colors.

15. The system of claim 14, wherein, when a color transformation mismatch occurs, the at least two colors become substantially indistinguishable after passing though one of the video equipment and the display, wherein when one color of the at least two colors is about 100% of its range and another color of the at least two colors is set to about the reciprocal of the gain increase to that color that occurs when a transformation mismatch is present in the video equipment, and wherein the at least two colors that are at least partially adjacent in at least one of space and time in the test pattern are represented as one of a shape within a shape or as adjacent shapes that flash in time.

16. A non-transitory computer-readable medium carrying one or more sequences of instructions for detecting and quantifying a synchronization error in video equipment and audio equipment, wherein execution of the one or more sequences of instructions by one or more processors causes the one or more processors to perform a method comprising the steps of:

generating a test pattern;

processing the test pattern through video and audio equipment to obtain a processed test pattern;

outputting to user an audio sequence from the processed test pattern, comprising a series of sounds occurring over time; and displaying to the user, on an interactive display, a plurality of visual features from the processed test pattern comprising a first visual feature positioned at a first location on the display and a plurality of additional visual features positioned at a plurality of corresponding locations patterned around the first visual feature, each of the visual features having a visual appearance changing in form, wherein a location on the display of a matching visual feature whose form changes in sync with the output of the series of sounds indicates the magnitude of the synchronization error between the video and audio equipment as a function of the distance between the first location and the location on the display of the matching visual feature.

17. The computer-readable medium of claim 16 wherein the test pattern that is generated is indicative of video compression losses due to quantization and comprises a periodic signal of at least one frequency distributed over a plurality of levels of amplitude in at least one of space and time such that, when a level of amplitude falls below a predetermined level, there is a cessation of contrast from a background pattern, the cessation of contrast being indicative of a step size of quantization.

18. The computer-readable medium of claim 17, wherein the periodic signal is indicative of a plurality of frequencies, wherein the test pattern comprises a set of concentric rings of a two-dimensional sinusoidal pattern, wherein the amplitude of the test pattern drops with angle and wherein the step size of quantization is indicated as a clock position.

19. The computer-readable medium of claim 16, wherein the test pattern that is generated comprises luma and chroma parts, the luma part of which remains substantially unchanged after a color transformation between a first and second video transmission standard, the test pattern being generated from a locus of color values that is the intersection between a first plane representing a first weighted sum of color values in a color space and a second plane representing a second weighted sum of color values in the color space, the first sum being weighted based on the first video transmission standard and the second sum being weighted based on the second video transmission standard, and wherein generating the test pattern is based on finding an intersection of planes formed by the equation $$Y=(R601*R)+(G601*G)+(B601*B) \text{ and } Y=(R709*R)+(G709*G)+(B709*B)$$

where R601, G601, B601 represent constant weights in a range between 0 and 1 for the colors red, green, and blue according to the Rec. 601 transmission standard, respectively, R709, G709, and B709 represent constant weights in a range between 0 and 1 for the colors red, green, and blue according to the Rec. 709 transmission standard, respectively, and Y is a predetermined constant value of 1 uma, and R, G, and B are red, green, and blue color space variables, respectively.

20. The computer-readable medium of claim 16, wherein the test pattern that is generated comprises at least two colors, wherein when a color transformation mismatch occurs due to processing with incompatible video transmission standards, the resulting pattern displays a reduction in contrast between the at least two colors.

* * * * *